United States Patent [19]

Peterson et al.

[11] Patent Number: 5,893,249
[45] Date of Patent: Apr. 13, 1999

[54] ARRANGEMENT FOR CONNECTING SECTIONS

[75] Inventors: Jan Ingvar Peterson, Höganäs; Jan Ingemar Wilkens, Ängelholm; Gert Kenneth Frost, Mellbystrand; Stig Mikael Andersson, Helsingborg; Arne Gustav Loodberg, RÅÅ, all of Sweden

[73] Assignee: Ecophon AB, Hyllinge, Sweden

[21] Appl. No.: 08/945,559

[22] PCT Filed: Apr. 29, 1996

[86] PCT No.: PCT/SE96/00560

§ 371 Date: Oct. 24, 1997

§ 102(e) Date: Oct. 24, 1997

[87] PCT Pub. No.: WO96/35026

PCT Pub. Date: Nov. 7, 1996

[30] Foreign Application Priority Data

May 3, 1995 [SE] Sweden ................ 9501638

[51] Int. Cl.⁶ ........................... E04B 9/00
[52] U.S. Cl. .................... 52/506.07; 403/245
[58] Field of Search ................ 403/263, 245, 403/230; 52/506.07, 506.6

[56] References Cited

U.S. PATENT DOCUMENTS

| | | |
|---|---|---|
| 2,840,200 | 6/1958 | Wong . |
| 3,096,862 | 7/1963 | Purdy . |
| 3,898,782 | 8/1975 | Donato . |
| 4,264,231 | 4/1981 | Rosenbaum . |
| 4,364,686 | 12/1982 | Sharp et al. . |
| 4,535,580 | 8/1985 | Shirey ............... 52/506.06 |
| 4,611,453 | 9/1986 | Worley . |
| 4,621,474 | 11/1986 | Worley . |
| 4,648,230 | 3/1987 | Mieyal et al. . |
| 4,712,350 | 12/1987 | Vukmanic . |
| 4,827,681 | 5/1989 | Platt ............... 52/506.07 |
| 5,154,031 | 10/1992 | Wall . |

FOREIGN PATENT DOCUMENTS

| | | |
|---|---|---|
| 0205673 A1 | 12/1986 | European Pat. Off. . |
| 3939632 A1 | 6/1991 | Germany . |
| 2145752 | 4/1985 | United Kingdom . |
| 2200153 | 7/1988 | United Kingdom . |

Primary Examiner—Carl D. Friedman
Assistant Examiner—Dennis L. Dorsey
Attorney, Agent, or Firm—Burns, Doane, Swecker & Mathis, L.L.P.

[57] ABSTRACT

An arrangement for connecting at least one transverse section (1, 2) and a main section (3) in a system of sections, especially for supporting suspended ceilings, comprises a laterally resilient locking tongue (9) projecting from the end of the transverse section and having a laterally projecting hook member (15), and a connecting hole (6) arranged in the main section and adapted to receive the locking tongue (9). Separate free-standing guide means (10, 11) are arranged on the end of the transverse section (1) for cooperating with the connecting hole (6) so as to impart to the transverse section (1, 2) and the main section (3) a fixed relative position when connected.

22 Claims, 3 Drawing Sheets

ARRANGEMENT FOR CONNECTING SECTIONS

FIELD OF THE INVENTION

The present invention relates to an arrangement for connecting at least one transverse section and a main section in a system of sections, especially for supporting suspended ceilings, said arrangement comprising a projecting locking tongue arranged on the end of the transverse section and having a laterally projecting hook member and, formed in the main section, a connecting hole for receiving said locking tongue, the locking tongue being arranged to be laterally resilient during the connecting operation when being inserted into the connecting hole and during the disconnecting operation when being withdrawn from the connecting hole, thereby allowing the hook member to pass through the connecting hole into locking engagement on the opposite side of the main section, and to pass from such locking engagement and back through the connecting hole, respectively

BACKGROUND OF THE INVENTION

In prior-art arrangements of the type mentioned by way of introduction, the locking tongue has a double function by serving as guide means as well as locking means, the hook member arranged thereon being adapted to cooperate with the main section or with a second locking tongue arranged from the opposite direction and belonging to a second transverse section. The rigidity of the locking tongue is considerable, in many cases by the locking tongue being formed with embossed portions, longitudinal beads or the like. As will be appreciated, this affects the resilience of the locking tongue in a negative way, which makes it difficult to mount and dismount a transverse section. Moreover a remaining deformation of the locking tongue often arises when bending it laterally outwards, as is required in mounting and dismounting. Such deformation is, of course, disadvantageous and may cause, among other things, an inaccurate positioning of the associated transverse section.

A further problem is that prior-art designs of the locking tongues in many cases involve such a length of the locking tongues that after mounting in a main section, they protrude significantly on the side of the main section facing away from the mounted transverse section. This is particularly unfavourable when a single transverse section is to be connected, i.e. when there is no second transverse section aligned with the first transverse section on the opposite side of the main section.

In the latter case of connecting a single transverse section, the positioning will, as a rule, be more inaccurate owing to the locking tongue being movable in the connecting hole which is generally formed to receive two locking tongues

OBJECT OF THE INVENTION

The object of the invention is to eliminate the above described problems to a considerable degree and to provide an arrangement which makes mounting and dismounting much easier by the force required for connecting and disconnecting a transverse section being small;

an arrangement in which the risk of remaining deformations of the locking tongue is substantially obviated;

an arrangement which results in excellent positioning independently of whether it is used to connect a single transverse section or to connect two transverse sections arranged opposite one another; and an arrangement in which the end of the locking tongue projecting after the connecting hole can be made very short.

SUMMARY OF THE INVENTION

According to the invention, the above object is achieved by an arrangement having the features stated in the appended claims.

The invention thus is based on the knowledge that substantial advantages can be achieved by the locking and guiding functions of the transverse section being separated. To this end, separate free-standing guide means are arranged on the end of the transverse section for cooperating with the main section so as to give the transverse section and the main section a well defined, fixed relative position when connected. This implies that the guide means can be designed exclusively to have a good guiding function, i.e. they can be designed without resilience requirements etc. needing be complied with, at the same time as the locking tongue can be designed with the aim of giving good resilience with no risk of remaining deformations when being bent laterally outwards.

The use of separate guide means which are specially designed for their function means that each individual transverse section can be very accurately positioned relative to the main section, i.e. independently of whether the transverse section is to be mounted together with a second, oppositely arranged transverse section or not.

The separate guide means can advantageously comprise one or more separate guiding tongues projecting freely from the end of the transverse section and arranged to engage in corresponding guide holes in the main section in the connected position. Each guide hole preferably consists of a portion of the connecting hole of the locking tongue, thereby facilitating the punching of the hole.

As will be easily appreciated, e.g. guiding tongues and the associated guide holes can be conformed to each other, such that an accurate positioning is obtained quite independently of the cooperation of the locking tongue with the connecting hole.

The guide means advantageously comprise guide means which are arranged above the locking tongue and below the locking tongue, respectively, the associated guide holes suitably consisting of opposite end portions of the connecting hole, in which case the intermediate portion of the connecting hole is adapted to receive the locking tongue between two guiding tongues.

As will be immediately appreciated, the connecting hole of the locking tongue in the main section can easily be designed so as to be able to receive, as desired, guide means of a transverse section or two opposed transverse sections with an accurate guiding function, by the guide holes for each guide means being separately designed to give an independent guiding function, although they constitute a part of one and the same connecting hole. Of course, it is also possible to use completely separate guide holes for the guide means, said guide holes being separated from the connecting hole.

The guide means can also comprise a stepped terminal area or projection formed on the lower flange part of the transverse section and adapted to rest on the border area of the lower side flange of the main section. It will be appreciated that this design can be combined with one or more preferably tongue-shaped guide means above and/or below a more centrally positioned locking tongue.

The locking tongue can advantageously project freely from the transverse section from a position thereon, which after connecting is substantially spaced from the web part of the main section, preferably adjacent or outside the longitudinal outer edge of the lower side flange of the main section, such that the locking tongue during connecting and disconnecting, respectively, can be laterally resilient beginning at a considerable distance from the web part of the main section. This design permits little resilience and thus a very small risk of remaining deformations when bending the locking tongue laterally outwards during mounting and dismounting of the associated transverse section.

According to a preferred embodiment, a central locking tongue as well as guide means in the form of guiding tongues arranged on both sides of the locking tongue are formed in a tongue-shaped extension of the web part of the transverse section, the locking tongue and the guiding tongues being separated by a slot on each side of the locking tongue, said slots extending from the free end of the tongue-shaped extension and longitudinally towards the web part of the transverse section. At least one of these slots advantageously extends into the web part of the transverse section. It is preferable to have the slots extend a distance of different length towards or into the web part of the transverse section.

The locking tongue can suitably be provided with the pertaining hook member immediately adjacent to its free end, which permits just a slight protrusion from the connecting hole on the side of the main section facing away from the transverse section. The hook member can consist of a part punched from the actual locking tongue, although other designs are of course possible. For instance, the hook member could be formed by the outermost free end portion of the locking tongue being folded laterally outwards, suitably perpendicular to the plane of the locking tongue.

The invention will now be described in more detail with reference to the accompanying drawings which illustrate some embodiments.

DESCRIPTION OF THE PREFERRED EMBODIMENTS

Figure 1:
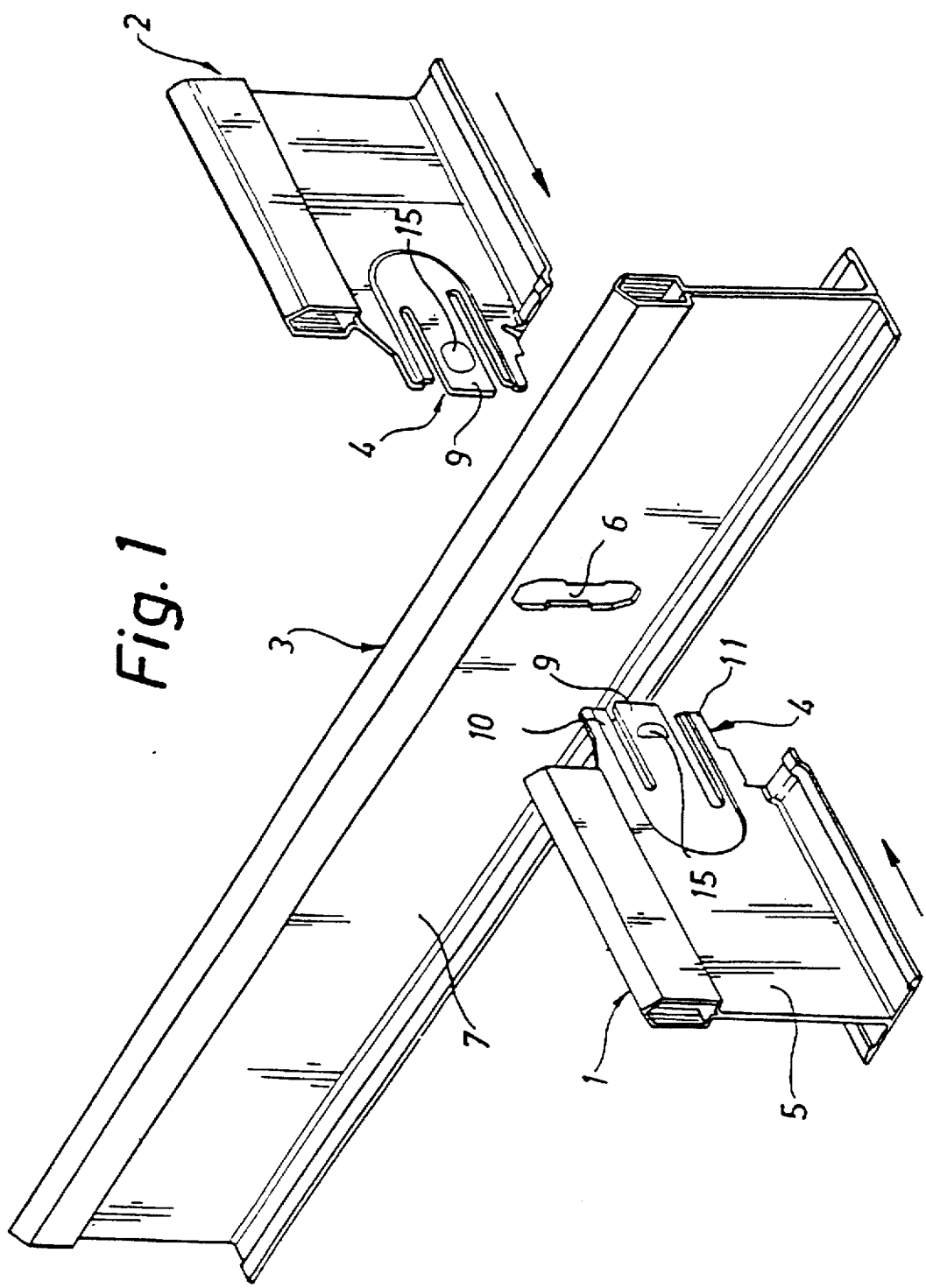
FIG. 1 is a schematic exploded perspective view which illustrates the connecting of a main section and two oppositely arranged transverse sections.

FIG. 1 illustrates the connecting of two oppositely arranged transverse sections 1, 2 to a main section 3. The sections, of which only small portions are shown, can be included in a suspended ceiling suspension system of conventional type and are as usual of an inverted T-form having a web part and, at the bottom thereof, side flanges projecting in the respective directions. The sections are made of metal and can be roll-formed.

Figure 2:
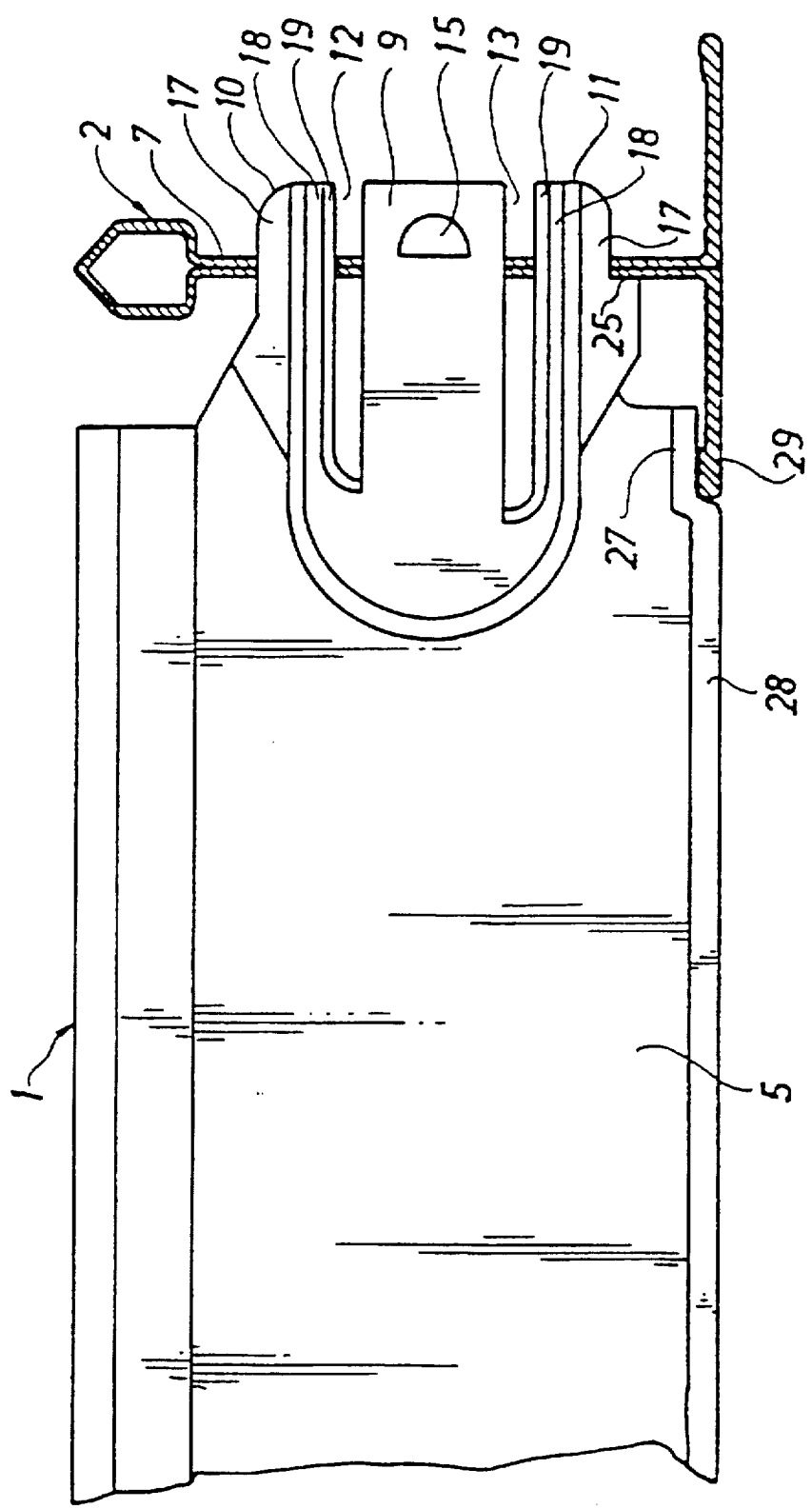
FIG. 2 is a side view of the end portion of a transverse section connected to a main section which is shown cross-section.
Figure 3:
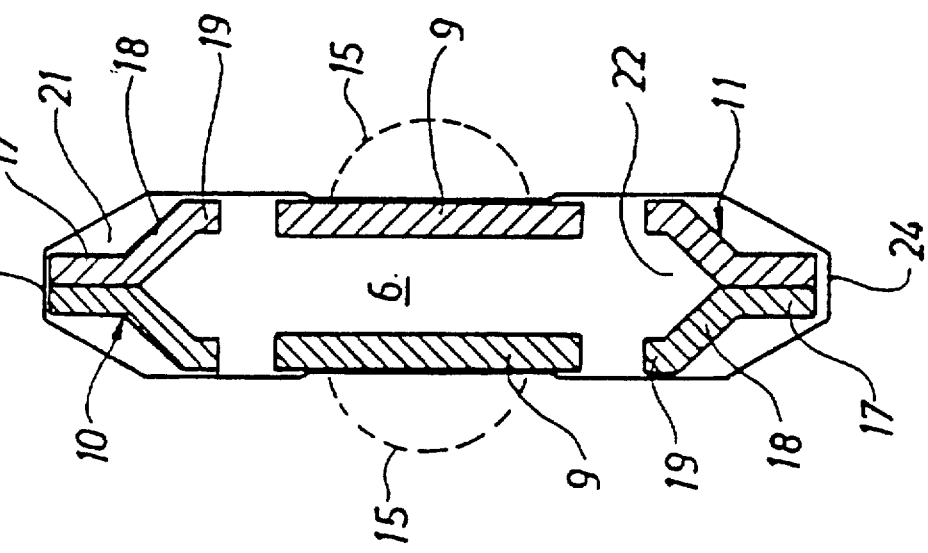
FIG. 3 is a part-sectional view of the web part of the main section in the plane of the web part, illustrating the cooperation between the locking and guiding tongues of two transverse sections and the connecting hole of the main section according to FIGS. 1 and 2.

The connecting of the transverse sections to the main section is illustrated in more detail in FIGS. 2 and 3. FIG. 2 showing, for the purpose of elucidation, only one transverse section.

From the web part end of each transverse section projects an integrated tongue-shaped extension 4, which is adapted to be inserted into and cooperate with a connecting hole 6 in the web part 7 of the main section 3. The extension 4, like a connecting portion of the web part 5 of the transverse section, is pressed out or laterally offset, thereby obtaining a correct centering of the two transverse sections 1, 2 when the extensions 4 are inserted side by side into the connecting hole 6.

Each extension 4 comprises a central locking tongue 9 and two separate guiding tongues 10, 11 arranged in parallel on both sides of the locking tongue 9. The guiding tongues 10, 11 are separated from the locking tongue 9 by slots 12, 13 being formed from the free end of the extension 4 and in parallel inwards in the longitudinal direction of the transverse section 1, such that the slots 12, 13 extend into the web part 5 of the transverse section 1. The slots 12, 13 extend a distance of different length into the web part. In the embodiment illustrated, the lower slot 13 extends inwards a longer distance than the upper slot 12.

The planar locking tongue 9 is at its end fitted with a hook member in the form of a punched tongue member 15, which has an abutment surface facing the transverse section and adapted to cooperate with the "rear side" of the web part 7 of the main section 3. The hook member 15 is indicated by dashed lines in FIGS. 3 and 4.

The guiding tongues 10, 11 are angular in cross-section (see FIGS. 3 and 4) for adaptation to the guide hole portions of the connecting hole 6 for the purpose of positioning each transverse section 1, 2 relative to the main section 3. In the embodiment according to FIGS. 1-3, each guiding tongue 10, 11 thus has an outer part 17 extending substantially in parallel with the web part 5, an intermediate inclined part 18, and an inner part 19 adjoining the pertaining slot and also extending substantially in parallel with the web part 5 but being further laterally offset away from the web part 5.

The connecting hole 6 has a central portion with parallel walls, which is adapted to receive the locking tongues 9. This portion is of a width which is slightly greater than the sum of the thickness of the locking tongues 9 and the lateral extent of the hook member 15 from the locking tongue 9. As will be immediately appreciated, it will thus be possible to insert, for instance, a second locking tongue with its hook member 15 into the connecting hole 6, although a first locking tongue has already been inserted. To make it possible for the hook member 15 of each locking tongue to pass through the connecting hole 6 during mounting or dismounting, the locking tongue 9 must, as will be appreciated, be laterally bent, such that the hook member 15 will be aligned with the connecting hole 6 and can pass therethrough. Owing to the inventive configuration, such bending requires but little force because of the long spring excursion of the locking tongue 9 and the lack of reinforcements etc. of the locking tongue.

Further, the connecting hole 6 has special guide hole portions adapted to receive and position the guiding tongues 10, 11. The guide holes for the guiding tongues consist of the upper and lower, specially designed end portions 21, 22 of the connecting hole 6. The end portions are designed in such a manner that the guiding tongues 10, 11 while being inserted are automatically given a predetermined position. In the embodiment shown in FIGS. 1-3, a very accurate positioning is achieved when the guiding tongues of two oppositely arranged transverse sections are inserted and cooperate with each other and with the walls of the connecting hole. The inner part 19 of the guiding tongues 9, 10 engages with the side walls of the guide hole portions 21, 22, while the outer parts 17 of the guiding tongues abut against each other and simultaneously fill the ends of the hole portions 21, 22 to a considerable extent, the dimensions of said ends being reduced.

The height of the connecting hole 6 corresponds to the width of the tongue extension 4, i.e. the outer edges of the guiding tongue parts 17 connect with the top and bottom 23, 24, respectively, of the connecting hole 6, which results in improved stability and positioning.

It will be appreciated that the walls of the hole portions 21, 22 could be further adapted in respect of form to the profile of the guiding tongues 9, 10 for the purpose of also improving the positioning.

For the purpose of especially guiding the position of the transverse sections 1, 2 longitudinally as well as vertically, the lower guiding tongue 11 is, in the embodiment shown in FIGS. 1–3, provided with a stepped abutment surface 25 on the outer part 17, said abutment surface 25 being adapted to abut against the web part of the main section immediately below the connecting hole 6. A corresponding abutment surface could, of course, be arranged alternatively or also on the upper guiding tongue 10.

In the embodiment according to FIGS. 1–3, each transverse section has a stepped terminal area 27 ending the lower flange part 28. This area is adapted to rest on the border area 29 of the lower side flange of the main section 3, such that a planar lower surface is obtained and the positioning is further improved. The edge of the border area 29 suitably abuts against the stepped surface which forms in the position where the terminal area 27 begins.

Figure 4:
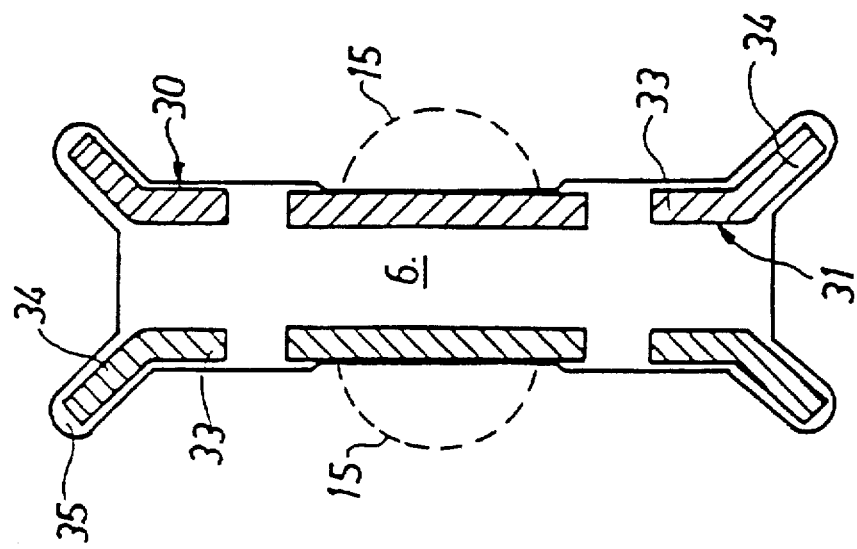
FIG. 4 is a view of the same type as in FIG. 3, but illustrating an alternative embodiment of the connecting hole and the guiding tongues.

FIG. 4 illustrates a further embodiment of the invention, which means that a transverse section is exactly positioned quite independently of whether there is an oppositely arranged transverse section or not. This is achieved by each guiding tongue 30, 31 being individually locked in a form-fit manner in a pertaining guide hole, which here, too, consists of end portions of the connecting hole 6.

In the embodiment shown in FIG. 4, the guiding tongues 30, 31 are angled once and have an inner part 33 essentially corresponding to the part 19 in FIG. 3, and, connected therewith, an outwardly angled outer part 34. The part 33 cooperates with the associated vertical hole side wall, while the part 34 largely fills a corresponding, outwardly angled corner hole extension 35.

According to the invention, an arrangement is thus provided, which permits extremely simple and reliable mounting and dismounting of transverse sections. For the necessary lateral outwards bending of the locking tongue of a transverse section, very little force is required. Such outwards bending can be effected by gently pressing the locking tongue with a finger or a thumb, and this can be carried out on any side of the main section. This possibility is particularly advantageous, since in many cases the accessibility is not the same on both sides of the main section.

We claim:

1. An arrangement for connecting at least one transverse section and a main section in a system of sections, said arrangement comprising:

at least one transverse section including a projecting locking tongue arranged on an end of the at least one transverse section, and a main section having a laterally projecting hook member formed therein, a connecting hole for receiving said locking tongue, the locking tongue being arranged to be laterally resilient during a connecting operation when being inserted into the connecting hole and during a disconnecting operation when being withdrawn from the connecting hole, thereby allowing the hook member to pass through the connecting hole into locking engagement on the opposite side of the main section, and to pass from such locking engagement and back through the connecting hole, respectively, and guide means, separate from the locking tongue, arranged on the end of the at least one transverse section for cooperating with the main section, thereby imparting to the at least one transverse section and the main section a fixed relative position when connected.

2. The arrangement as claimed in claim 1, wherein the locking tongue projects freely from the at least one transverse section from a position thereon, which after connecting is substantially spaced from the web part of the main section, adjacent to or outside of the longitudinal outer edge of the lower side flange of the main section, such that the locking tongue during connecting and disconnecting, respectively, can be laterally resilient beginning at a considerable distance from the web part of the main section.

3. The arrangement as claimed in claim 1, wherein the locking tongue is fitted with said hook member immediately adjacent to its free end.

4. The arrangement as claimed in claim 1, wherein said guide means comprise a stepped terminal area or projection on the lower flange part of the at least one transverse section, said terminal area or projection being adapted to rest on the border area of the lower side flange of the main section.

5. The arrangement as claimed in claim 1, wherein said at least one transverse section includes two transverse sections aligned with one another and arranged on opposite sides of the main section, the locking tongues of the transverse sections being adapted to be inserted inn parallel into the connecting hole, wherein the guide means of the two transverse sections are adapted to cooperate to provide the fixed position on accomplishment of the connection.

6. The arrangement as claimed in claim 1, wherein said at least one transverse section includes two transverse sections aligned with one another and arranged on opposite sides of the main section, the locking tongues of the transverse sections being adapted to be inserted in parallel into the connecting hole, wherein the guide means of the two transverse sections are adapted to provide, independently of each other, the fixed position of each transverse section.

7. The arrangement as claimed in claim 1, wherein said separate guide means comprise one or more guiding tongues projecting from the end of the at least one transverse section and arranged to engage in corresponding guide holes in the main section in the connected position.

8. The arrangement as claimed in claim 7, wherein each guide hole consists of a portion of the connecting hole which receives the locking tongue.

9. The arrangement as claimed in claim 8, wherein said guide holes consist of opposite end portions of the connecting hole, the intermediate portion of the connecting hole being adapted to receive the locking tongue between two guiding tongues.

10. The arrangement as claimed in claim 1, wherein said guide means comprise upper and lower guide members arranged above the locking tongue and below the locking tongue, respectively.

11. The arrangement as claimed in claim 10, wherein said separate guide means comprise one or more guiding tongues projecting from the end of the at least one transverse section and arranged to engage in corresponding guide holes in the main section in the connected position.

12. The arrangement as claimed in claim 10, wherein the locking tongue projects freely from the at least one transverse section from a position thereon, which after connecting is substantially spaced from the web part of the main section, adjacent to or outside of the longitudinal outer edge of the lower side flange of the main section, such that the locking tongue during connecting and disconnecting, respectively, can be laterally resilient beginning at a considerable distance form the web part of the main section.

13. The arrangement as claimed in claim 10, wherein the locking tongue is fitted with said hook member immediately adjacent to its free end.

14. The arrangement as claimed in claim 10, wherein a central locking tongue as well as said guide members arranged on both sides of the locking tongue are formed in a tongue-shaped extension of the web part of the transverse section, the locking tongue and the guide members being separated by a slot on each side of the locking tongue, said slots extending from the free end of the tongue-shaped extension and longitudinally towards the web part of the at least one transverse section.

15. The arrangement as claimed in claim 10, wherein said at least one transverse section includes two transverse sections aligned with one another and arranged on opposite sides of the main section, the locking tongues of the transverse sections being adapted to be inserted in parallel into the connecting hole, and wherein the guide means of the two transverse sections are adapted to cooperate to provide the fixed position on accomplishment of the connection.

16. The arrangement as claimed in claim 10, wherein said at least one transverse section includes two transverse sections aligned with one another and arranged on opposite sides of the main section, the locking tongues of the transverse sections being adapted to be inserted in parallel into the connecting hole, and wherein the guide means of the two transverse sections are adapted to provide, independently of each other, the fixed position of each transverse section.

17. The arrangement as claimed in claim 1, wherein a central locking tongue as well as guide means in the form of guiding tongues arranged on both sides of the locking tongue are formed in a tongue-shaped extension of the web part of the at least one transverse section, the locking tongue and the guiding tongues being separated by a slot on each side of the locking tongue, said slots extending from the free end of the tongue-shaped extension and longitudinally towards the web part of the at least one transverse section.

18. The arrangement as claimed in claim 17, wherein at least one of the slots extends into the web part of the at least one transverse section.

19. The arrangement as claimed in claim 18, wherein the slots extend a distance of different length towards the web part of the at least one transverse section.

20. The arrangement as claimed in claims 18, wherein the slots extend a distance of different length into the web part of the at least one transverse section.

21. The arrangement as claimed in claim 17, wherein the slots extend a distance of different length into the web part of the at least one transverse section.

22. The arrangement as claimed in claim 17, wherein the slots extend a distance of different length towards the web part of the at least one transverse section.

* * * * *